United States Patent [19]

Liu

[11] Patent Number: 5,918,186
[45] Date of Patent: Jun. 29, 1999

[54] RECHARGEABLE BATTERY ENABLING REDUCTION OF BATTERY OVERHEATING PROBABILITY DURING CHARGING

[75] Inventor: Jiewen Liu, Cary, N.C.

[73] Assignee: Ericsson Inc., Research Triangle Park, N.C.

[21] Appl. No.: 08/731,292

[22] Filed: Oct. 15, 1996

[51] Int. Cl.[6] ..................................................... H01M 2/00
[52] U.S. Cl. ........................... 455/572; 455/90; 455/575; 429/7; 429/97; 429/123; 320/110; 320/150
[58] Field of Search ..................................... 455/572, 573, 455/575, 90, 128; 429/96, 97, 98, 99, 100, 123, 120, 7, 27; 320/150, 152, 153, 107, 110

[56] References Cited

U.S. PATENT DOCUMENTS

| | | | |
|---|---|---|---|
| 3,745,048 | 7/1973 | Dinkler et al. | 429/120 |
| 5,019,767 | 5/1991 | Shirai et al. | 320/112 |
| 5,086,509 | 2/1992 | Inubushi et al. | 455/575 |
| 5,151,643 | 9/1992 | Emmert et al. | 455/90 |
| 5,160,879 | 11/1992 | Tortola et al. | 429/970 |
| 5,172,043 | 12/1992 | Toops | 429/7 |
| 5,280,273 | 1/1994 | Goldstein | 429/96 |
| 5,475,626 | 12/1995 | Viletto | 361/680 |
| 5,525,888 | 6/1996 | Toya | 429/98 |
| 5,592,065 | 1/1997 | Oglesbee et al. | 320/113 |
| 5,604,050 | 2/1997 | Brunette et al. | 429/97 |
| 5,693,431 | 12/1997 | Nierescher et al. | 429/97 |

FOREIGN PATENT DOCUMENTS

| | | |
|---|---|---|
| 0 383 559 a | 8/1990 | European Pat. Off. . |
| 0 391 020 A | 10/1990 | European Pat. Off. . |
| 0 613 204 A | 8/1994 | European Pat. Off. . |
| 0 635 963 A | 1/1995 | European Pat. Off. . |
| 0 692 838 A | 1/1996 | European Pat. Off. . |
| 0 795 968 A | 9/1997 | European Pat. Off. . |
| 91 16 176 U | 4/1992 | Germany . |

OTHER PUBLICATIONS

Patent Abstracts of Japan, vol. 096, No. 009, 30 Sep. 1996 & JP 08 130039 A (Sanyo Electric Co Ltd), 21 May 1996, see Abstract.

Patent Abstracts of Japan, vol. 095, No. 006, 31, Jul. 1995 & JP 07 065808 A (Matsushita Electric Ind Co Ltd), 10 Mar. 1995, see Abstract.

Patent Abstracts of Japan, vol. 096, No. 010, 31 Oct. 1996 & JP 08 162169 A (Toshiba Battery Co Ltd), 21 Jun. 1996, see Abstract.

Primary Examiner—Willis R. Wolfe
Assistant Examiner—Hieu T. Vo
Attorney, Agent, or Firm—Nixon & Vanderhye P.C.

[57] ABSTRACT

A battery for an electronic device includes a device engaging side having structure that operatively secures the battery to the electronic device to provide power to the electronic device, an exterior side opposite from the device engaging side, which faces a supporting surface during charging, and a spacer attached to the exterior side that engages the supporting surface during charging, thereby spacing the exterior side from the supporting surface during charging. By virtue of the structure including a spacer attached to the exterior side of the battery, the exterior side is spaced from the supporting surface during charging, and heat dissipation and air circulation are improved. The spacer may be formed integral with the exterior side and may be formed in any of a plurality of shapes and configurations. Spacing the exterior surface of the battery from the supporting surface provides an efficient and inexpensive method of reducing the probability of battery overheating during charging.

16 Claims, 5 Drawing Sheets

5,918,186

RECHARGEABLE BATTERY ENABLING REDUCTION OF BATTERY OVERHEATING PROBABILITY DURING CHARGING

BACKGROUND OF THE INVENTION

The present invention relates to rechargeable batteries for electronic devices and, in particular, to reducing battery overheating probability during charging of the rechargeable batteries.

Many electronic devices such as cellular phones include a rechargeable battery as a power source for the device. The battery is typically charged by connecting the phone to a charger. During the charging operation, the temperature of the battery will normally increase because some of the electrical inputs, such as the charge current, are converted to heat within the battery cells (see FIG. 1). Overheating of the battery, however, decreases charging efficiency and can cause battery damage (see FIG. 2). Battery temperature is thus a critical parameter in the charging process.

Overheating during charging can be caused by various factors. For example, overheating may be caused by the designs of the hardware charging circuit, the charging algorithm, software control process, or charging accessories. The technical designs may be refined to prevent potential overheating problems. In addition to searching for better technical methodologies, a simple solution can be used to improve air circulation during charging and reduce the probability of battery overheating.

Typically, rechargeable batteries may contain a built-in thermistor, and the battery temperature can be monitored directly by the control software during charging. In this regard, the charging process is pulsed or aborted if the battery temperature increases above a charging temperature limit. However, the product costs could be significantly reduced by removing the built-in thermistor. In this context, battery temperature has to refer to the device ambient temperature. Since these two temperature measurements lack correlation, however, it is difficult to accurately and promptly detect battery overheating, and charging control is more challenging. If the battery temperature increases without detection by the control components, overheating could result.

SUMMARY OF THE INVENTION

It is therefore an object of the invention to provide a configuration that overcomes the drawbacks noted above with respect to conventional arrangements. It is another object of the invention to provide a simple and effective configuration for reducing battery overheating probability during charging, while eliminating a built-in thermistor.

The structure according to the present invention spaces the battery from a supporting surface during charging. The additional space is easily created without major structural modification of the battery design. By virtue of the space, air circulation and heat dissipation around the battery are improved, and overheating probability is reduced.

Phone batteries typically include a smooth and flat exterior surface. During battery charging, a phone connected to a charger is put on a supporting surface such as a desk, table or the like. Since both the battery and the supporting surface are flat and smooth, there is little air circulation from the battery, and heat is difficult to dissipate. Air circulation can be improved by generating a space between the battery and the supporting surface.

In an exemplary embodiment according to the invention, there is provided a rechargeable battery for an electronic device that is recharged by coupling with a charger connected to a power source. The battery includes a device engaging side including structure that operatively secures the battery to the electronic device to provide power to the electronic device, an exterior side opposite from the device engaging side that faces a supporting surface during charging, and a spacer attached to the exterior side that engages the supporting surface during charging, thereby spacing the exterior side from the supporting surface during charging. The spacer is preferably formed integral with the exterior side. In alternative arrangements, the spacer includes at least one bar extending substantially laterally across the exterior side, at least one bar extending substantially longitudinally along the exterior side, at least one peg, raised letters formed on the exterior side, or a raised pattern formed on the exterior side.

In accordance with another aspect of the invention, there is provided a cellular phone including a main terminal having phone electrical components, and a battery attached to the main terminal and operatively coupled with the electrical components providing power to the electrical components. The battery includes a device engaging side including structure that operatively secures the battery to the main terminal, an exterior side opposite from the device engaging side that faces a supporting surface during charging, and a spacer attached to the exterior side that engages the supporting surface during charging, thereby spacing the exterior side from the supporting surface during charging.

In accordance with yet another aspect of the invention, there is provided a method of reducing battery heating during charging in an electronic device powered by the battery. The method includes spacing an exterior surface of the battery from a supporting surface enabling heat generated during charging to dissipate. The method may include attaching a spacer to the battery exterior surface. In this regard, the spacer may be formed integral with the battery exterior surface.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Referring to the FIGURES, the present invention is described in conjunction with a battery for cellular phones for exemplary purposes only. Those of ordinary skill in the art will contemplate alternative applications of the concepts according to the invention, and the invention is not meant to be limited to batteries for cellular phones.

According to the present invention, it is proposed to space an exterior surface of the phone battery from the supporting surface to provide for better air circulation and heat dissipation during charging. To accomplish this, referring to FIG. 3, a battery 10 is attachable to an electronic device and is rechargeable by coupling the battery with a charger connected to a power source. A device engaging side 12 of the battery 10 includes structure that operatively secures the battery 10 to the electronic device to provide power to the electronic device. The structure operatively securing the battery to the electronic device is well known and the details of the structure will not be further described. The battery also includes an exterior side 14 opposite from the device engaging side 12. During charging, the exterior side 14 faces a supporting surface such as a desk, table or the like. In order to space the exterior side 14 from the supporting surface during charging, a spacer 16 is attached to the exterior side and engages the supporting surface during charging. In preferred forms, the spacer 16 is formed integral with the exterior side 14.

Figure 1:
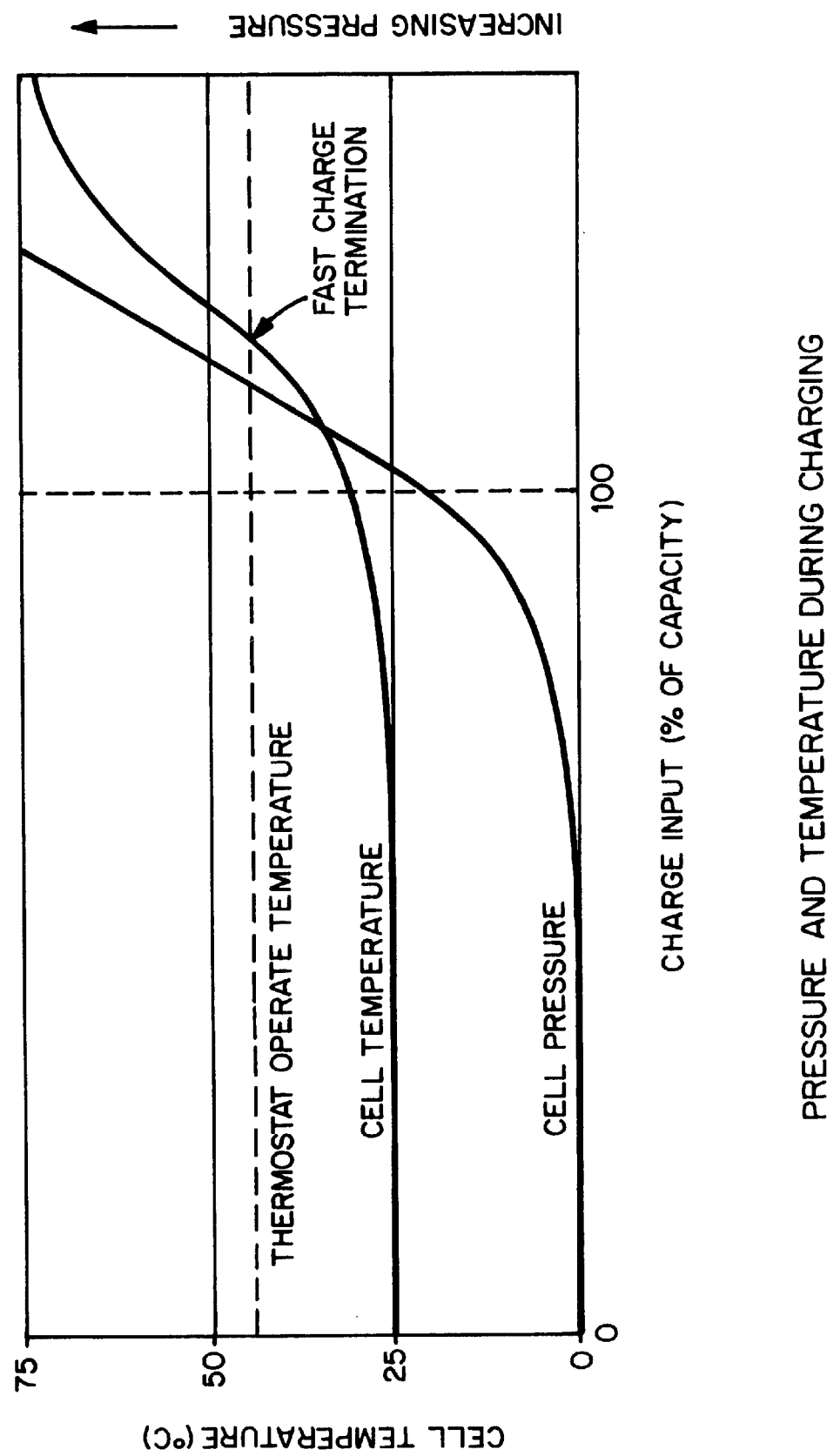
FIG. 1 is a graph illustrating battery temperature increase during charging.
Figure 2:
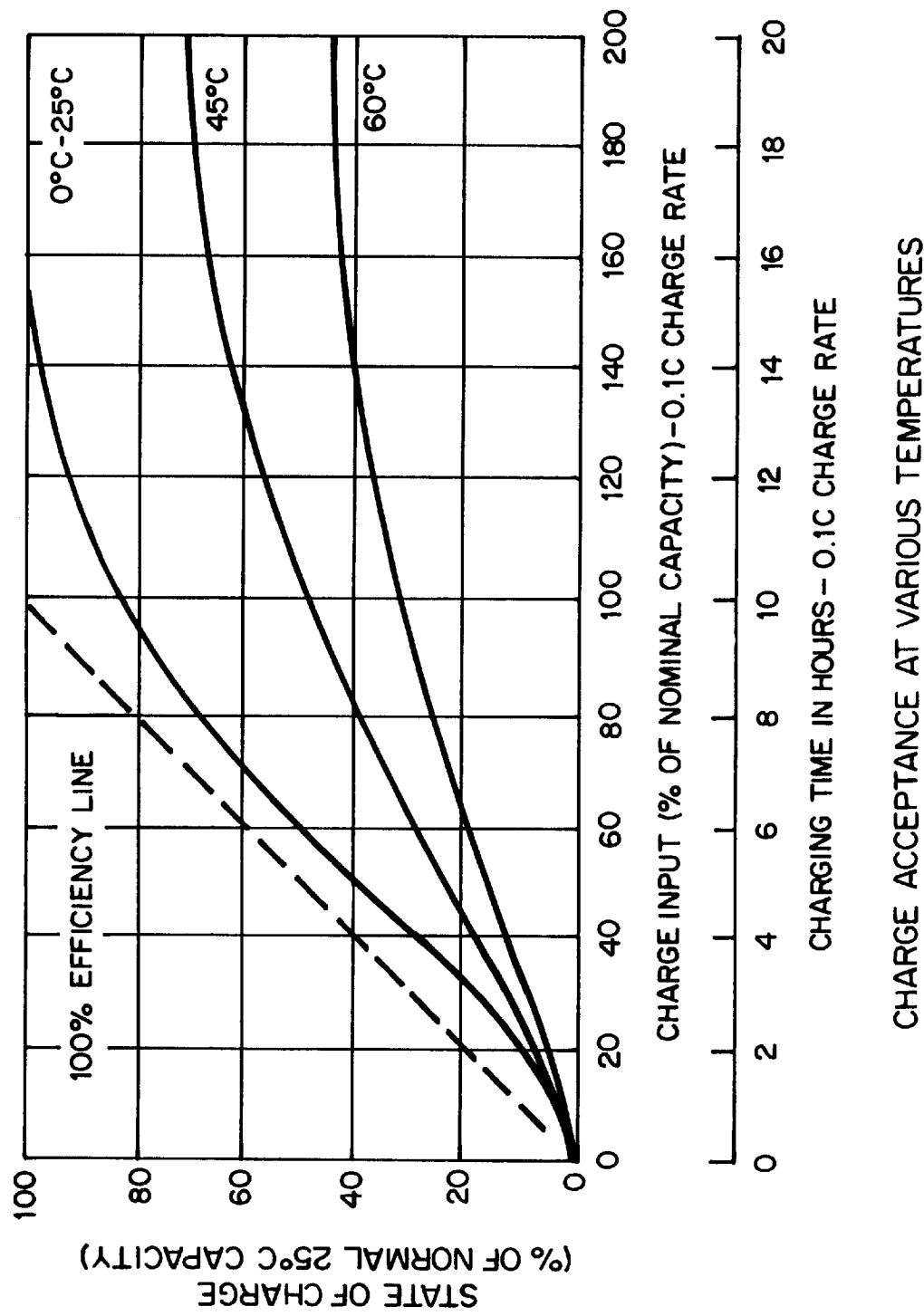
FIG. 2 is a graph illustrating charge efficiency at various temperatures.
Figure 3:
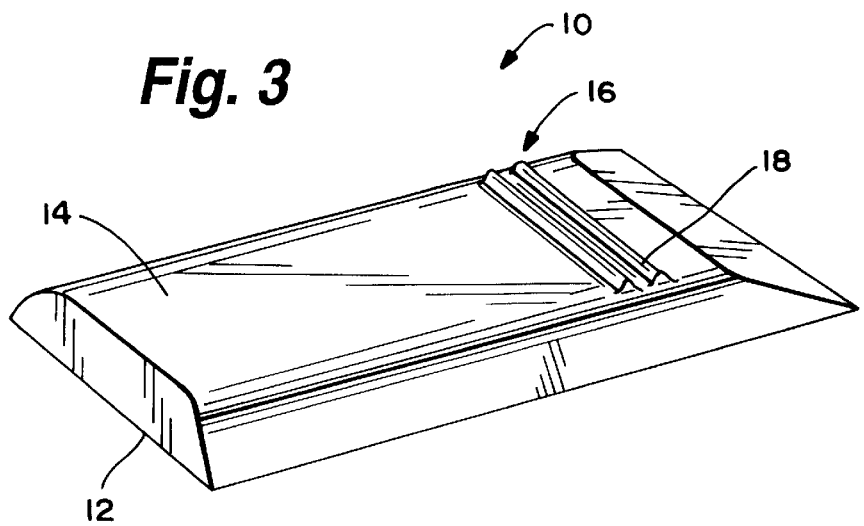
FIG. 3 is a perspective view of a battery according to the present invention including a laterally extending bar.

As shown in FIG. 3, the spacer 16 is constituted by a bar 18 extending laterally across the width of the battery exterior side 14. Although two laterally extending bars 18 are shown in FIG. 3, a single bar or multiple bars may also be provided.

Figure 4:
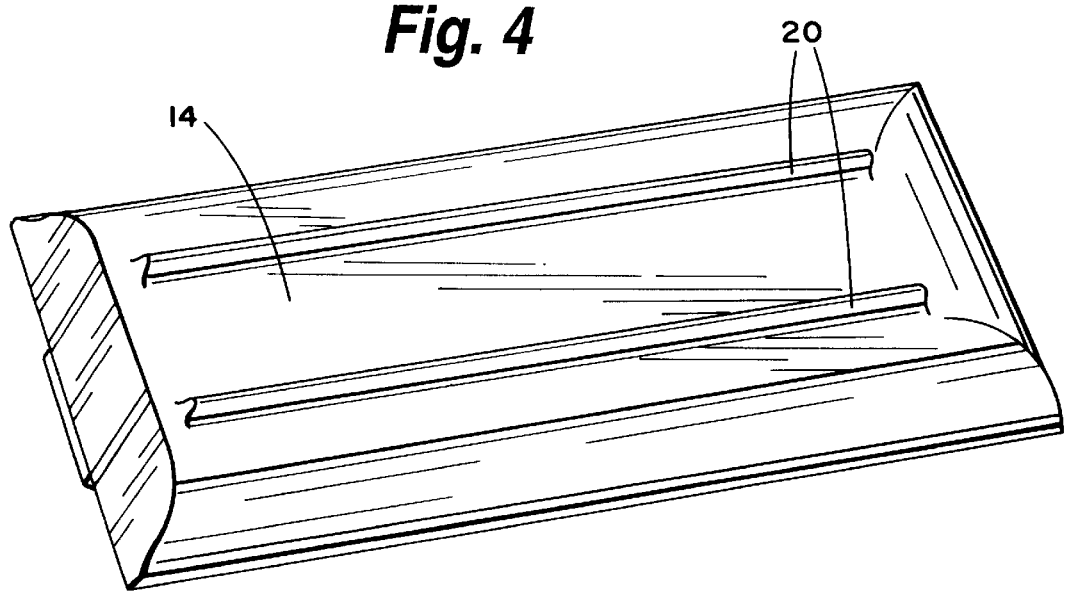
FIG. 4 is a perspective view of an alternative configuration including a longitudinally extending bar.
Figure 5:
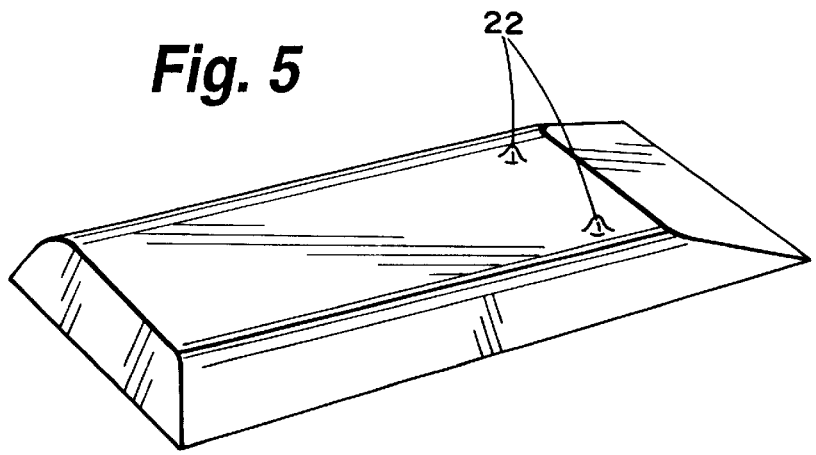
FIG. 5 is yet another alternative configuration including pegs.
Figure 6:
FIG. 6 is a perspective view of still another configuration according to the invention including raised letters.
Figure 7:
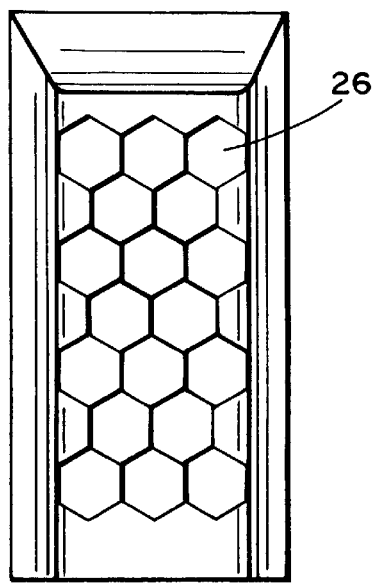
FIG. 7 is a plan view of the battery according to the present invention including a raised pattern.

Referring to FIG. 4, the spacer may include bars 20 extending substantially longitudinally along the length of the battery on the exterior side 14. FIG. 5 illustrates yet another configuration according to the invention where the spacer comprises one or more pegs 22. FIG. 6 shows the spacer including raised letters 24 formed on the exterior side. Finally, FIG. 7 illustrates the spacer as a raised pattern 26 formed on the exterior side. Of course, any structure that serves to space the exterior side from the supporting surface during charging would be suitable, and the invention is not meant to be limited to the spacers that are illustrated and described.

Figure 8:
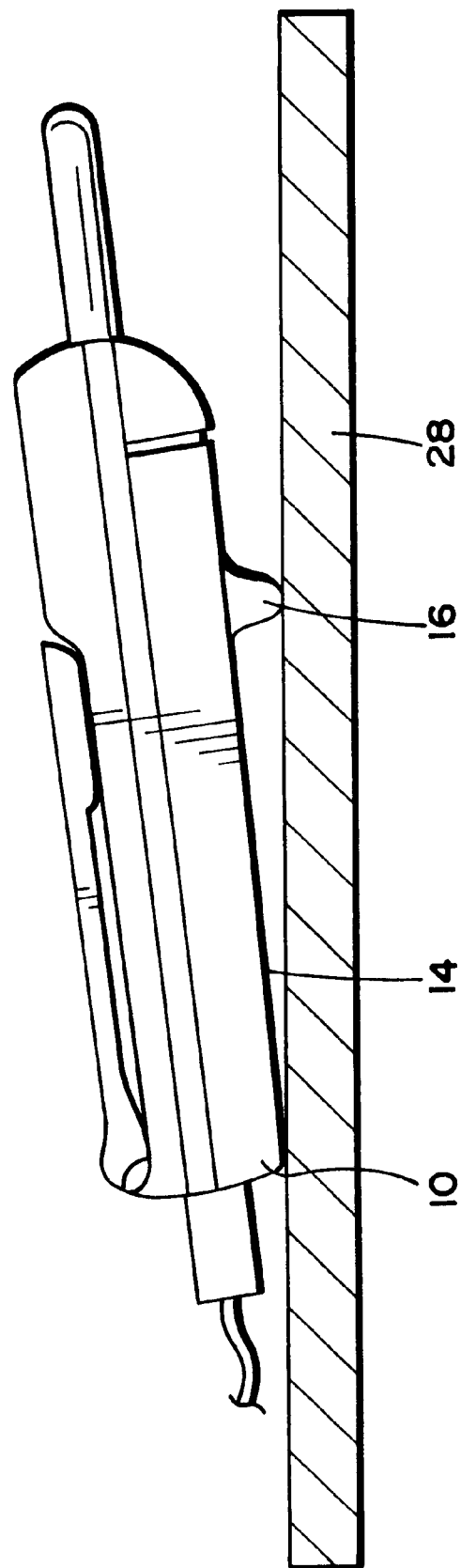
FIG. 8 is a side view of a cellular phone incorporating the battery according to the present invention.

FIG. 8 is a side view of a cellular telephone incorporating the battery 10 according to the invention. As shown in FIG. 8, a spacer 16 similar to that illustrated in FIG. 3 spaces the battery exterior side 14 from the supporting surface 28 enabling improved air circulation and heat dissipation during charging.

In an experiment conducted by utilizing the battery according to the present invention and a conventional battery, the conventional battery without the spacer, which was substantially flush with the supporting surface, tended to heat up significantly during charging, while the battery utilizing the spacer remained well below the temperature cut-off level specified by the control algorithm.

By adding a spacer to the exterior side of a battery for a cellular phone or other electronic device, heat dissipation and air circulation are improved, reducing the potential for battery overheating and improving the efficiency of battery charging. The addition of a spacer is a very low cost alternative to complicated temperature control algorithms.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rechargeable battery for an electronic device that is recharged by coupling with a charger connected to a power source, the battery comprising:
   a device engaging side including structure that operatively secures the battery to the electronic device to provide power to the electronic device;
   an exterior side opposite from and substantially parallel to said device engaging side, said exterior side facing a supporting surface during charging; and
   a spacer attached to said exterior side that engages the supporting surface during charging, thereby spacing said exterior side from the supporting surface during charging.

2. A rechargeable battery according to claim 1, wherein said spacer is formed integral with said exterior side.

3. A rechargeable battery according to claim 1, wherein said spacer comprises at least one bar extending substantially laterally across said exterior side.

4. A rechargeable battery according to claim 1, wherein said spacer comprises at least one bar extending substantially longitudinally along said exterior side.

5. A rechargeable battery according to claim 1, wherein said spacer comprises at least one peg.

6. A rechargeable battery according to claim 1, wherein said spacer comprises raised letters formed on said exterior side.

7. A rechargeable battery according to claim 1, wherein said spacer comprises a raised pattern formed on said exterior side.

8. A cellular phone comprising:
   a main terminal including phone electrical components; and
   a battery attached to said main terminal and operatively coupled with said electrical components providing power to said electrical components, said battery including:
      a device engaging side including structure that operatively secures said battery to said main terminal,
      an exterior side opposite from and substantially parallel to said device engaging side, said exterior side facing a supporting surface during charging, and
      a spacer attached to said exterior side that engages the supporting surface during charging, thereby spacing said exterior side from the supporting surface during charging.

9. A cellular phone according to claim 8, wherein said spacer is formed integral with said exterior side.

10. A cellular phone according to claim 8, wherein said spacer comprises at least one bar extending substantially laterally across said exterior side.

11. A cellular phone according to claim 8, wherein said spacer comprises at least one bar extending substantially longitudinally along said exterior side.

12. A cellular phone according to claim 8, wherein said spacer comprises at least one peg.

13. A cellular phone according to claim 8, wherein said spacer comprises raised letters formed on said exterior side.

14. A cellular phone according to claim 8, wherein said spacer comprises a raised pattern formed on said exterior side.

15. A method of reducing battery overheating probability during charging in an electronic device powered by the battery, the method comprising:
   providing the battery with a device engaging side including structure that operatively secures the battery to the electronic device to provide power to the electronic device;
   providing the battery with an exterior side opposite from and substantially parallel to the device engaging side, the exterior side facing a supporting surface during charging; and
   providing the battery with a spacer attached to the exterior side that engages the supporting surface during charging, thereby spacing an exterior surface of the battery from a supporting surface enabling heat generated during charging to dissipate.

16. A method according to claim 15, comprising forming the spacer integral with the battery exterior surface.

* * * * *